UNITED STATES PATENT OFFICE.

MOSES W. KIDDER, OF LOWELL, MASSACHUSETTS.

IMPROVEMENT IN PAINTS.

Specification forming part of Letters Patent No. 117,301, dated July 25, 1871.

*To all whom it may concern:*

Be it known that I, MOSES W. KIDDER, of Lowell, in the county of Middlesex and Commonwealth of Massachusetts, have invented a new and useful combination as a substitute for linseed or other drying oils, for the purpose of fixing pigments upon surfaces of wood, paper, &c.

The nature of my invention consists: 1st, in the combination of about thirty ounces of a saturated solution of bichromate of potassa, with a gallon of a solution of gelatine or glue, containing about six ounces of glue to the gallon. This compound must be prepared by artificial light, and kept (until applied) from the daylight, as while so kept it remains soluble in water, but upon exposure to light it becomes insoluble. 2d, the pigments are next combined with the prepared glue, as heretofore described, in any desired proportion, as for oil painting. It is now ready for use and is applied as ordinary paint, after which the chemical effect of the light upon it renders the compound of gelatine and bichromate of potassa insoluble, and, to a great extent, fire-proof, thus fixing the pigments firmly upon any surface to which they may be applied.

I claim as my invention—

A paint compound, consisting of the ingredients in about the proportions herein mentioned, mixed together in the manner specified, and for the purpose set forth.

MOSES W. KIDDER.

Witnesses:
ABEL T. ATHERTON,
ALBERT M. MOORE.